Patented Nov. 28, 1944

2,363,921

UNITED STATES PATENT OFFICE 2,363,921

METHOD OF TREATING WATERS AND COMPOSITION THEREFOR

Wayne L. Denman, Berwyn, Ill., assignor to Dearborn Chemical Company, Chicago, Ill., a corporation of Illinois No Drawing. Application March 1, 1938,
Serial No. 193,366

20 Claims. (Cl. 210—23)

The present invention relates to the treatment of waters or aqueous baths having present ingredients inducing foaming.

In the more specific aspect, the present invention is directed to the treatment of aqueous baths, including boiler water, with a dispersible composition, containing as its essential anti-foam agent a ketone compound containing at least 11 carbon atoms and characterized by the properties of being substantially insoluble in the bath being treated, steam distilling to a negligible extent and showing little tendency to saponify with the ingredients of the bath.

It is quite desirable that the anti-foaming composition be effectively dispersed in the medium treated, and, therefore, in accordance with the present invention, there is mixed with the primary anti-foaming agent a dispersing agent. In the preferred form of the invention, the dispersing agent itself may have anti-foam properties, and further may also have the property of making the final composition non-corrosive.

In one form of the invention, the anti-foam composition has present an agent functioning to increase the viscosity of the composition and thereby inhibit or prevent the separation of the active or primary anti-foam constitutent or constituents of the composition from other ingredients present therein.

In the preferred form of this embodiment of the invention, the viscosity-increasing agent may also act as a dispersing agent. The composition may also have present an agent increasing the body thereof, and usually the viscosity-increasing agent acts as a bodying agent, although there may be present separate viscosity-increasing agents and bodying agents.

From the above, it is clear that the primary object of the present invention is to produce an efficient and economical anti-foam composition which has its anti-foam constituent or constituents properly dispersed in the form of a satisfactory emulsion or dispersion. In that connection, it may be stated that one manner of obtaining said object is to pass the anti-foam composition containing the primary anti-foam agent, a dispersing medium, together with a bodying agent, through a colloid mill. Such a composition may be passed through a colloid mill when it is cold, or after it is heated, and the bodying agent has been hydrolyzed, as more fully hereinafter pointed out.

In accordance with the present invention, there is also produced a stabilized emulsion or dispersion by controlling the pH of the composition.

The present invention is particularly adapted for the treatment of water or aqueous baths containing alkaline constituents or compounds, or compounds or constituents inducing alkalinity. One field in which the composition containing an aliphatic ketone substantially insoluble in the bath being treated gives superior anti-foaming effects, is the treatment of boiler water, and particularly boiler waters containing "excess alkalinity." By this term, it is intended to define water in which the substances inducing alkalinity in the water are present in excess of that capable of combining with or existing in combination with the calcium and magnesium ions, salts or their chemical equivalents present in the water.

The present invention, utilizing ketones, their substitution products and derivatives, including halogen substituted and aromatic substituted ketones and hydroxy substituted ketones, said materials being substantially insoluble in water, and containing eleven (11) or more carbon atoms, may be used for the treatment of waters of any kind, or an aqueous bath of any kind containing ingredients adapted to induce foaming in the water or the aqueous bath. These ingredients may be, although not necessarily are, alkaline ingredients.

The present invention is particularly adapted for the treatment of waters of any kind, including boiler waters, which are alkaline and particularly those waters in which the alkalinity is present in a quantity sufficient to combine with the calcium and magnesium ions, salts or their equivalents contained in the waters.

Very satisfactory results have been obtained when the present invention has been applied to waters containing sodium or potassium alkalinity, that is, water in which the sodium or potassium alkalies, or their equivalents, and particularly sodium or potassium hydroxides, carbonates or bi-carbonates, exist in excess of that capable of combining with or existing in combination with calcium and/or magnesium ions present in the water.

Alkalinity of this type can exist naturally in the water or may be derived from zeolite treatment of the water, or may be derived in other ways.

The present invention may be applied to raw waters either hard or soft and beneficial results obtained. Water, which has been softened by the lime-soda-ash process or by phosphates, sodium silicates, or other alkaline treatment, may be treated with an anti-foam composition of the character herein set forth.

It is well known that many substances have decided anti-foam properties when used in conjunction with normal types of water which are free from excess alkalinity, such as sodium alkalinity, or which have a low percentage of sodium alkalinity. Castor oil and sperm oil typify such substances.

When materials of this type are added to waters of excess alkalinity, and especially excess sodium and/or potassium alkalinity, poor or mediocre results or obtained in reducing the foaming tendency of the water. It seems probable that the foaming occurring in boiler water is the result of the concentration of soluble salts and insoluble solids in a state of suspension. In waters of excess alkalinity there may be present sodium and/or potassium bi-carbonates and/or carbonates, and there may be present sodium and/or potassium carbonates and/or hydroxides. Under conditions prevailing in an operating boiler, a large percentage of the bi-carbonates and carbonates originally present in the water are converted into hydroxides. It may well be that because of the presence of these hydroxides that the usual anti-foam materials are ineffective when added to boiler waters having high or moderately high concentrations of alkali hydroxides or other alkali materials.

When oils of the above type are added to boiler water, there is a tendency for them to be saponified or react chemically with the alkali hydroxides or other alkali compounds, with the resultant formation of soluble sodium and/or potassium soaps. The foaming tendencies of sodium and potassium soaps are well recognized and the formation of such soaps accelerate the tendencies of the boiler water to foam.

The following is a specific example, illustrating such acceleration and foaming tendency. An experimental boiler operating at a pressure of 200 pounds per square inch, with an excess caustic alkalinity in the neighborhood of 200 grains per gallon, was treated with a standard anti-foam material containing 16% of castor oil by weight, the proportion being one-quarter pound of the castor oil material per 1000 gallons of water. Immediately after the introduction of the anti-foam material, a test showed no foaming occurring. One hour after the introduction of the anti-foam material, the amount of foaming occurring was approximately 25% greater than that taking place before the anti-foam material was added. The increase in foaming occurring one hour after the introduction of the anti-foam material, namely, castor oil, is due to the saponification of the same by the alkalies present in the boiler water.

Steam distillation of the usual anti-foam materials may, in some measure, reduce the effectiveness of these anti-foam materials in boiler water of high or excess sodium or equivalent alkalinity. However, since most of the usual anti-foam materials can be used effectively in water containing little or no sodium alkalinity, and their effectiveness maintained, to a large degree at least, for several hours, steam distillation of the anti-foam material is probably of minor importance.

In one form of the present invention, water containing alkalinity, and particularly sodium or potassium alkalinity, is treated with a material that is unsaponifiable and does not steam distill to any marked degree. Waters softened by base exchange processes, and especially those which have been treated with zeolites or waters having a high natural sodium carbonate or sodium bi-carbonate alkalinity are typical of waters having foaming properties and which may be treated in accordance with the present invention, which resides not only in said method, but also in the utilization of a particular class of anti-foam materials, and the method of preparing the same. While the average operating boiler pressure is around 200 pounds per square inch, it is to be understood that the present invention is applicable to boiler pressures materially higher or lower than 200 pounds per square inch.

The present invention, in its narrower form, contemplates the use of compositions containing saturated and/or unsaturated ketones, said compounds being substantially insoluble in water and exhibiting substantially little tendency to steam distill, and preferably containing eleven or more carbon atoms, said compounds being used to inhibit the foaming tendency of raw or softened alkaline waters, and particularly boiler waters having an excess alkalinity, or an alkalinity present in a quantity more than sufficient to combine with the calcium and/or magnesium ions, salts or their equivalents contained in the water. As previously pointed out, the derivatives and substitution products of these compounds may be used. It may be stated that the compounds which it is preferred to use are those which are sparingly soluble or substantially insoluble in the water or aqueous bath treated. Since these compounds are insoluble or substantially so, it is desirable, if not absolutely necessary to disperse the primary anti-foam agent in the water or bath being treated. It may be stated that the solubility of the aliphatic compounds set forth decrease with the molecular weight thereof and, therefore, it is preferred to use anti-foaming agents having high molecular weight. However, the invention in its broad form is not limited to aliphatic ketones, or their derivatives or substitution products which have a high molecular weight. As to the ketones, those compounds which have a high molecular weight are usually substantially insoluble in water and, therefore, this is the preferred class of ketones used. In the more limited aspect of the invention, what is desirable, in many cases, and absolutely necessary in the treatment of boiler water, is that the anti-foaming agent be substantially insoluble in the water being treated, and that it does not steam distill to any substantial extent.

In accordance with the present invention, it is not desired, in the broad form of the invention, to be limited to any particular kind of dispersing agent. However, in the narrower form of the invention, tannin is the most suitable dispersing agent, as will be more fully hereinafter pointed out.

Three principal typical classes of dispersing agents are available. The first class comprises inorganic colloidal material, such as clays or bentonite; the second class, organic materials which contain appreciable quantities of soap in one form or another; and the third class, organic materials which are characterized by colloidal properties and which contain no soap of any kind. This third class of materials includes the extracts of various woods and barks which would normally be referred to as tannin extracts; extracts of various aquatic plants, such as seaweeds or kelp; and extracts of certain plants and shrubs, such as cactus plants.

Clays or bentonite may, of course, be used, but the disadvantages of this type of material makes it inadvisable to use it as the sole dispersion agent, since it does not lend itself to the very great dispersion that is necessary when a very small quantity of an anti-foaming compound is dissolved in a relatively large amount of boiler feed water. However, the clays or bentonite may be used as the dispersion agent when mixed with other materials, as hereinafter set forth.

The soap dispersion agents may under some circumstances be used, but certainly not where there is an excess of alkali present, because the soap, in this case, remaining water soluble would tend to conteract the anti-foam properties of the anti-foam agent, and, moreover, in some cases, function to increase the foaming properties of the boiler water instead of decreasing them.

Investigation has shown that tannin is a very desirable dispersing agent, because at least when waters having alkaline constituents are treated, and particularly boiler waters, the tannin has better dispersing properties than the clays or soap, while at the same time it does not have the disadvantages of the latter classes of materials.

It may be pointed out that tannin in certain cases and in certain types of waters, has fairly good anti-foam properties and, therefore, the use of tannin in conjunction with a more active anti-foam agent results in a composition having anti-foam properties superior to that of either the materials used separately. Further, the tannin acts as an active dispersing agent for the more active or primary anti-foam material, and this is highly desirable in a good anti-foam composition. Again, the tannin performs the function of conferring upon the resulting composition non-corrosive properties. This is due to the tendency of the tannin extract and similar materials to absorb dissolved oxygen from the boiler feed water or from any other water containing oxygen, which oxygen, if not removed, is one of the principal causes of boiler corrosion. Tannin, of course, is an example of a material which is an active dispersing medium and also acts as a corrosion inhibitor to prevent corrosion of the boiler metal. It is within the province of the present invention in its broad form to use other equivalent materials which perform the same functions as the tannin performs.

The composition may have present a viscosity-increasing agent or bodying material. A number of compounds may be used as the bodying agent, but it is preferable to use corn meal or a material containing starch. The corn-meal or starch acts not only as a bodying material, but also as an additional dispersing agent and increases the dispersion characteristics of the composition. In accordance with one form of the present invention, the anti-foam composition has present a primary dispersion agent, and a secondary dispersion agent, the secondary dispersion agent preferably acting also as a bodying agent or to increase the viscosity of the anti-foam composition, which, of course, contains anti-foam agents, as hereinbefore pointed out.

The increase in the viscosity of the anti-foam composition is desirable since this prevents separation of the active anti-foam constituents from the remainder of the composition.

The following are examples of methods which may be used to obtain the bodying effect.

In one method the meal or starch is heated in the presence of added water or that contained in the liquid tannin extract to a temperature high enough to produce a hydrolysis of the meal. This hydrolyzed meal upon cooling takes on the form of starch paste and acts to increase the viscosity of the anti-foam composition in proportion to the amount of starch or meal used.

The amount of bodying agent used in the anti-foam composition may, of course, vary. The present invention will be illustrated by the use of a ketone as the active primary anti-foam agent. The ketone material may be a simple ketone, saturated or unsaturated, or a mixed ketone, saturated or unsaturated, the simple ketone being exemplified by dipentadecyl ketone, commercially known as Palmitone; and diheptadecyl ketone, known as Stearone. The mixed ketones are exemplified by pentadecyl heptadecyl ketone and methyl heptadecyl ketone. The ketone agent or material may be a mixture of simple and mixed ketones, as for example, dipentadecyl and pentadecyl heptadecyl ketone; or diheptadecyl ketone and pentadecyl heptadecyl ketone; and dipentadecyl and methyl heptadecyl ketone.

In carrying out the present invention, the ketone anti-foam agent may be a mixture of simple ketones, saturated or unsaturated, or a mixture of mixed ketones, saturated or unsaturated; a mixture of stearone and palmitone exemplify a mixture of simple ketones, while pentadecyl, heptadecyl ketone and methyl heptadecyl ketone exemplify a mixture of mixed ketones. The ketone anti-foam agent may contain a mixture of one or more simple ketones with one or more mixed ketones, both types of ketones being saturated or unsaturated.

The following is an illustrative example of the present invention.

A ketone, such as stearone, is mixed with a small percentage of corn meal and a predominating quantity of liquid tannin extract well known in the prior art, and the mixture is heated to a temperature sufficient to produce a hydrolysis of the meal, and to gelatinize the final product. Satisfactory results have been obtained by heating the mixture to about 180° F. Higher temperatures may be used. This mixture is fed into the boiler in the form of a water suspension.

As indicated, the preferred form of the anti-foam composition for introduction into the boiler feed water is that of a gelatinized product. Such a gelatinized composition may be made by mixing together a ketone, such as stearone, palmitone or any other ketone or ketone mixture set forth, with corn meal and tannin extract.

The ingredients may be mixed in suitable proportions, of which the following Tables I to V are illustrative:

*Table I*

(1) Corn meal—2%, tannin extract—94%, ketone—4%
(2) Corn meal—4%, tannin extract—88%, ketone—8%
(3) Corn meal—6%, tannin extract—78%, ketone—16%
(4) Corn meal—8%, tannin extract—67%, ketone—25%
(5) Corn meal—8%, tannin extract—57%, ketone—35%

In general, the ketone content of the mixture may vary between about 2% to 35%.

The above percentages are merely illustratives as the amount of tannin extract and ketone, its derivatives or substitution products, may vary within the limit of the maximum and minimum above set forth and still come within the spirit of the present invention. As hereinbefore pointed out, the primary anti-foam base, such as the ketone, its substitution product or derivative, may be used by itself, but it is highly desirable that the primary anti-foam agent be used in conjunction with the tannin, as the tannin assists in the dispersion, and further is in itself an anti-foam agent. It is preferred to form a gelatinized product of the ingredients, but here again, it is within the spirit of the present invention to use the primary anti-foam agent in an anti-foam composition which is not reduced to paste form.

Instead of using corn meal or starch as the viscosity-increasing or bodying agent, various other such agents may be used, as for example, dextrine. When using dextrine, satisfactory results have been obtained when the mixture contained from 5% to 50% of dextrine, which is a degradation product of starch. Instead of using corn meal, starch or dextrine, other bodying agents may be used. Gums, such as gum tragacanth, gum acacia and locust bean gum, which are additional examples of suitable bodying agents, give good results.

It has been ascertained that excellent results are obtained when the bodying material is one which will produce borate ions, as for example, borax may be used as the bodying agent, or the borax may be mixed with an additional bodying agent, such as corn meal or dextrine.

The following examples illustrate how the dispersion agents and the bodying agents may be varied:

*Table II*

| Ketone | Tannin extract | Corn meal |
|---|---|---|
| Per cent | Per cent | Per cent |
| 2 | 92 | 6 |
| 5 | 89 | 6 |
| 10 | 84 | 6 |
| 15 | 79 | 6 |
| 20 | 75 | 5 |
| 30 | 66 | 4 |
| 35 | 61 | 4 |

*Table III*

| Ketone | Tannin extract | Bentonite | Corn starch |
|---|---|---|---|
| Per cent | Per cent | Per cent | Per cent |
| 2 | 87 | 5.0 | 6.0 |
| 5 | 84 | 5.0 | 6.0 |
| 10 | 79 | 5.0 | 6.0 |
| 15 | 74 | 5.0 | 6.0 |
| 20 | 70 | 5.0 | 5.0 |
| 30 | 61 | 5.0 | 4.0 |
| 35 | 56 | 5.0 | 4.0 |
| 2 | 82 | 10 | 6.0 |
| 5 | 79 | 10 | 6.0 |
| 10 | 74 | 10 | 6.0 |
| 15 | 70 | 10 | 5.0 |
| 20 | 65 | 10 | 5.0 |
| 30 | 56 | 10 | 4.0 |
| 35 | 51 | 10 | 4.0 |

*Table IV*

| Chlorinated ketone | Tannin extract | Dextrine | Borax |
|---|---|---|---|
| 2 | 85 | 12 | 1.0 |
| 5 | 82 | 12 | 1.0 |
| 10 | 77 | 12 | 1.0 |
| 15 | 72 | 12 | 1.0 |
| 20 | 67 | 12 | 1.0 |
| 30 | 57 | 12 | 1.0 |
| 35 | 52 | 12 | 1.0 |

In the above illustrative example, borax used as the bodying agent, may be replaced by boric acid or by any water soluble borate, or by any substance capable of giving borate ions when dissolved in water. The amount of borax may vary over wide limits, the minimum being approximately one-eighth (1/8) of one per cent (1%), and the maximum around 5%.

*Table V*

| Hydroxy ketone | Tannin extract | British gum |
|---|---|---|
| 2 | 86 | 12 |
| 5 | 83 | 12 |
| 10 | 78 | 12 |
| 15 | 73 | 12 |
| 20 | 68 | 12 |
| 30 | 58 | 12 |
| 35 | 53 | 12 |

It is desired to point out that the above examples are merely illustrative of suitable combinations of dispersing agents and bodying agents, together with ketones, chlorinated ketones or hydroxy ketones prepared as hereinafter set forth, and that various other dispersing agents and bodying agents may be used and still come within the spirit of the present invention.

The alkali phosphates, such as meta-sodium phosphate, mono-sodium phosphate, di-sodium phosphate and tri-sodium phosphate may be used as the dispersing agents.

Satisfactory results have also been obtained by using as the dispersing agent a sodium salt of the sulphuric acid esters of high molecular weight alcohols, such compounds being commercially known under the trade name of Orvus, Gardinol or Dreft. These compounds included under the aforesaid designations, are known as sodium Lauryl sulphate. In general, it may be stated that these materials may be designated as the sodium sulphates of high molecular weight alcohols having 10 to 14 carbon atoms.

It is clear from the above that the bodying agent may be an inorganic or an organic compound. Further, it is desired to point out that many of the bodying agents set forth also act as dispersing agents, and in the preferred embodiment of the present invention, the bodying agents also act as dispersing agents. It is not desired to limit the present invention to any particular inorganic or organic bodying agent. Broadly, any bodying agent may be added which will function to increase the viscosity of the mixture, and preferably also assist in effecting a satisfactory emulsion or dispersion.

In some cases, the bodying agent may be a mixture of organic bodying agents, or may be a mixture of inorganic bodying agents, or the bodying agent may be a mixture of organic and inorganic compounds. In either case, it is preferred that the bodying agent be a dispersing agent.

While usually the amount of bodying agent will vary from 2% to 8%, it may be much higher, as for example, when using dextrine, up to about 50% by weight of the mixture may be dextrine, and again it is not necessary that in some of the bodying agents that the lower limit be 2%. Less than 2% may be used, and while 2% may be considered a satisfactory lower limit for starch, if the starch is used in conjunction with other thickening agents, such as a gum, then the starch may be reduced to less than 2%.

The primary anti-foam agent, such as the aliphatic ketone, its derivatives or substitution products, may be mixed with a dispersing agent, preferably one which is also an anti-foam agent, as for example, tannin, and with a bodying agent, such as corn meal and starch, and these materials, without heating, may then be passed through a colloid mill. In a mill of this character, a shearing occurs which results in reducing the particle size of the starch and thereby greatly increases the bodying effect of the bodying agent over what it is in the cold composition before the latter has been put through the colloid mill. While the passage of the material through the colloid mill favorably reduces the particle size of the starch, it also effectively operates upon the remaining ingredients of the composition, and thereby forms a permanent emulsion. It is thought to be broadly new to form a permanent emulsion containing an anti-foaming agent of the character described, and also broadly new to form a permanent emulsion of an anti-foaming agent of the character described, the dispersing agent and a bodying agent.

The reduction in the size of the primary anti-foam agent, such as the aliphatic ketone, produces a much more active anti-foam agent.

Heretofore, there has been set forth the heating of the anti-foam composition to a temperature sufficient to produce a hydrolysis of the bodying agent, such as corn meal, starch and the like. The heated combination after the hydrolysis of the starch may be passed through a colloid mill or its equivalent to produce a very effective anti-foam composition. It may be pointed out that if the anti-foaming composition herein described is heated sufficiently to result in hydrolysis of the starch, dextrine or like product before passing the same through the colloid mill, that there will still be produced a satisfactory dispersion of the primary anti-foam agent despite the fact that the material containing the hydrolyzed starch will become very much stiffer in composition if it has been allowed to cool and set. When the unheated anti-foam composition is passed through the colloid mill, a satisfactory dispersion may be obtained in like manner but the final composition will be somewhat thinner, due to the lack of gel being present, the latter resulting from the hydrolysis of the cooked starch or like agent.

It may be pointed out that by passing the composition through the colloid mill, the particle size of the suspended material is reduced to a greater extent than that which is obtained by the use of any of the ordinary dispersing agents or dispersing equipment. It may be stated that it is this great reduction in the particle size of the suspended material which is responsible for the stiffening effect when the anti-foam emulsion is passed through the mill. It may also be pointed out that while the use of the colloid mill does result in the stiffening of the herein described anti-foam composition, this stiffening effect is a minor one, as compared to the stiffening effect which is accomplished by the use of a bodying agent.

The times, when it is desirable to use a stiffer or thinner anti-foam composition, are not dependent upon the type of water which is to be treated, but rather on the method of introducing the anti-foam composition and the climatic conditions to which the anti-foam composition is subjected during storage. For example, when it is the practice to use hot water in digesting the anti-foam composition before its introduction into the boiler, it is usually desirable to use a stiffer type of anti-foam composition than is used if the cold water is a digesting medium. Stiffer emulsions as a rule are more stable than the thinner ones, and if hot water is used as the digesting medium a somewhat stiffer and, therefore, a somewhat more stable anti-foam emulsion can be satisfactorily digested. When using cold water, it is some times difficult to satisfactorily break up or digest a stiff emulsion, and for this reason it is necessary that the product used be somewhat thinner. It is also commonly appreciated that with higher temperatures, the emulsions tend to become somewhat thinner. When anti-foam material is stored in very hot warehouses or other places where temperatures in the neighborhood of 90° or 100° F. are present, thinner emulsions become quite fluid, and the tendency for the conglomeration of the suspended particles is increased due to the lower viscosity of the product. Where an anti-foam composition is liable to be subjected to conditions typified by those above mentioned, it is desirable to use a stiffer or heavier product. On the other hand, during midwinter, when the anti-foam composition may be subjected to a relatively low temperature, it is desirable to use a thinner product.

In view of the above, in accordance with the present invention, the stiffness of the anti-foam composition may be controlled by the use of a bodying agent alone, or by the use of a bodying agent and the passage of the material through a colloidal mill to reduce the particle size of the suspended material. To decrease the stiffness less bodying agent is used, and to increase the stiffness, more bodying agent is used. The stiffness may be controlled even though the bodying agent is not hydrolyzed.

Anti-foam compositions of the character set forth may be stabilized, or at least their stabilization may be promoted, by the proper adjustment of the pH value of the composition.

In most cases, although not in every case, the emulsion or dispersion is more stable if the pH of the composition is maintained at the neutral point or just slightly alkaline. In other words, it is best to maintain the pH of the composition between 7 and 8, and this is especially true when using starch, corn meal, dextrine or the gums.

A paste mixture prepared by any of the methods set forth and containing a primary anti-foam agent, a secondary anti-foaming agent, which preferably has dispersing properties, and a bodying agent of the character herein set forth may be added to boiler water to prevent foaming thereof. More specifically, any of the compositions herein set forth may be added to the boiler water in the ratio of one-quarter pound of the composition per 1000 gallons of water. The amount which may be added is strictly illustrative, and is not to be taken by way of limitation. Obviously, the amount of anti-foam material which is added to the water will depend upon the characteristics of the water. For example, in another experiment it was found that as low as one-twentieth (1/20) of a pound of the anti-foam composition per 1000 gallons of water was satisfactory. In still another case, two (2) pounds of the anti-foam composition per 1000 gallons of water positively inhibited the anti-foam tendency of the boiler feed.

The above mixtures and similar mixtures were added to water of the character that the castor oil, previously referred to, was added, and the conditions of the tests were the same.

Tests taken immediately after the introduction of the anti-foam composition showed no foaming occurring. Tests made two and onehalf (2½) hours after the introduction of the anti-foam material showed the foaming to be practically nil. Tests which were made after continuous heating of the anti-foam material in the boiler water, under the above conditions, for eight (8) hours, showed a tendency to foam, which was only a small fraction of the foaming occurring before the anti-foam was added. After twenty (20) hours, the tendency to form was not quite as great as that exhibited by the untreated water. Even in the presence of the anti-foam material, there is some tendency to foam, and the amount of foaming in the presence of the anti-foam material, may vary from a very small percentage to 25% to 40% of the foaming that occurs before the anti-foam material is added.

The following ketones have given good results for the treatment of boiler water to prevent foaming thereof:

*Simple ketones*

Caprinone
$$C_9H_{19}COC_9H_{19}$$
Laurone
$$C_{11}H_{23}COC_{11}H_{23}$$
Myristone
$$C_{13}H_{27}COC_{13}H_{27}$$
Palmitone
$$C_{15}H_{31}COC_{15}H_{31}$$
Stearone
$$C_{17}H_{35}COC_{17}H_{35}$$
Oleone
$$C_{17}H_{33}COC_{17}H_{33}$$

*Mixed ketones*

Undecyl tridecyl ketone
$$C_{11}H_{23}COC_{13}H_{27}$$
Undecyl heptadecyl ketone
$$C_{11}H_{23}COC_{17}H_{35}$$
Tridecyl heptadecyl ketone
$$C_{13}H_{27}COC_{17}H_{35}$$
Pentadecyl heptadecyl ketone
$$C_{15}H_{31}COC_{17}H_{35}$$

The following ketones are similar in character to the ketones above set forth, and, therefore, they may be used for the treatment of water to prevent foaming:

*Simple saturated ketones*

Caprone
$$(C_5H_{11})_2CO$$
Caprylone
$$(C_7H_{15})_2CO$$
Arachidone
$$(C_{19}H_{39})_2CO$$
Behenone
$$(C_{21}H_{43})_2CO$$
Lignocerone
$$(C_{23}H_{47})_2CO$$
Cerotone
$$(C_{25}H_{51})_2CO$$
Montanone
$$(C_{27}H_{55})_2CO$$
Melissone
$$(C_{29}H_{59})_2CO$$

*Mixed saturated ketones*

Methyl undecyl ketone
$$CH_3COC_{11}H_{23}$$
Methyl dodecyl ketone
$$CH_3COC_{12}H_{25}$$
Methyl tridecyl ketone
$$CH_3COC_{13}H_{27}$$
Methyl tetradecyl ketone
$$CH_3COC_{14}H_{29}$$
Methyl pentadecyl ketone
$$CH_3COC_{15}H_{31}$$
Methyl hexadecyl ketone
$$CH_3COC_{16}H_{33}$$
Methyl heptadecyl ketone
$$CH_3COC_{17}H_{35}$$
Methyl nonadecyl ketone
$$CH_3COC_{19}H_{39}$$
Methyl heneicosyl ketone
$$CH_3COC_{21}H_{43}$$
Methyl tricosyl ketone
$$CH_3COC_{23}H_{47}$$
Methyl pentacosyl ketone
$$CH_3COC_{25}H_{51}$$
Methyl heptacosyl ketone
$$CH_3COC_{27}H_{55}$$
Methyl nonacosyl ketone
$$CH_3COC_{29}H_{59}$$

Applicant does not wish to be limited to the use of the above ketones themselves. Illustratively, the methyl group in the above mixed ketones may be substituted by a great number of radicals, and the resulting mixed ketone may be used for the treatment of water to prevent foaming. For example, the methyl radical in methyl undecyl ketone may be substituted by the following radicals: ethyl, propyl, iso-propyl, butyl, secondary butyl, tertiary butyl, hexyl, heptyl, nonyl, decyl, undecyl, dodecyl, tridecyl, tetradecyl, pentadecyl, hexadecyl, heptadecyl, nonadecyl, heneicosyl, tricosyl, pentacosyl, heptacosyl, and nonacosyl, forming ethyl undecyl ketone, propyl undecyl ketone, iso-propyl undecyl ketone, butyl undecyl ketone, secondary butyl undecyl ketone, tertiary butyl undecyl ketone, hexyl undecyl ketone, heptyl undecyl ketone, nonyl undecyl ketone, decyl undecyl ketone, undecyl undecyl ketone, dodecyl undecyl ketone, tridecyl undecyl ketone, tetradecyl undecyl ketone, pentadecyl undecyl ketone, hexadecyl undecyl ketone, heptadecyl undecyl ketone, nonadecyl undecyl ketone, heneicosyl undecyl ketone, tricosyl undecyl ketone, pentacosyl undecyl ketone, heptacosyl undecyl ketone, and nonacosyl undecyl ketone. Similar mixed ketones can be formed by substituting any one of the above radicals for the methyl group in methyl dodecyl ketone, methyl tridecyl ketone, methyl tetradecyl ketone, etc.

The following unsaturated ketones are similar in character to the saturated ketones above set forth, and, therefore, they may be used for the treatment of water to prevent foaming:

1. Ketones having the formula $(C_{15}H_{29})_2CO$
   a. Hypogaeone
   b. Gaidone, a stereometrical isomeride of hypogaeone.
   c. Physcoleone
   d. Palmitoleone
   e. Lycopodone 2. Ketones having the formula $(C_{17}H_{33})_2CO$
   a. Elaidone, a stereometrical isomeride of ordinary 9, 10, oleic acid and occurring in the following modification: 6, 7, elaidone, 8, 9, elaidone, 9, 10, elaidone.
   b. Iso-oleone, derived from iso-oleic acid which has been shown to be a mixture of 8, 9, elaidic acid, 9, 10 elaidic acid, hydroxy stearic acid and ordinary 9, 10, oleic acid.
   c. Rapone, derived from rapic acid.
   d. Petroselenone, derived from petroselenic acid.
   e. Cheiranthone, derived from cheiranthic acid.
3. Ketones having the formula $(C_{19}H_{37})_2CO$
   Gadoleone
4. Ketones having the formula $(C_{21}H_{41})_2CO$
   a. Erucideone
   b. Brassidone, derived from brassidic acid, which acid is the stereometric isomeride of erucic acid.

While the tannin extract herein set forth is preferably prepared from chestnut oak, it is obvious that tannin extracts may be used in accordance with the present invention which have been prepared from other well known prior art tannin-containing materials.

In carrying out the present invention, it is desirable to use aliphatic ketones, their substitution products or derivatives, of high molecular weight which have a specific gravity less than water, so as to eliminate any tendency of these anti-foam agents to settle to the bottom of the treatment vessel. However, anti-foam agents of the character specified having a density greater than water may be used, provided it is used in combination with a material which will have a buoying effect upon it, as well as with other materials which will enable the anti-foam agent to be satisfactorily dispersed, and give the anti-foam and/or dispersing agent a body sufficient to render the dispersion permanent. It may be stated that ketones, their substitution products or derivatives, having a specific gravity greater than water and which are sparingly soluble, or substantially insoluble in the bath being treated, irrespective of whether the ketones, their substitution products or derivatives are aliphatic or aromatic compounds, may be prepared in various manners well known in the art by substituting in the ketones themselves and by loading the side chains with materials such as halogen compounds or an aromatic nuclei. The ketones used, their substitution products or derivatives, may comprise a mixture of saturated and unsaturated compounds.

Halogen substituted ketones suitable for carrying out the present invention are prepared by chlorinating certain ketones. This chlorination was effected by means of chlorine gas acting on a chloroform solution of the ketone, or on the melted ketone. Various amounts of chlorine may be added.

No specific formulae are assigned to the chlorinated ketones set forth in the following table, due to the fact that these compounds may be chlorinated to various degrees and the resulting chlorinated compounds will vary accordingly. The following table sets forth the ketones which were chlorinated, and the gain in weight during chlorination in terms of the final weight. In other words, taking the weight of the chlorinated ketone as 100%, each compound treated had its weight increased due to chlorination by the percentages set forth in the table:

| Name of ketone chlorinated | Increase in weight during chlorination in terms of final weight, per cent |
| --- | --- |
| Caprinone | 22.1 |
| Laurone | 24.6 |
| Myristone | 18.0 |
| Palmitone | 16.3 |
| Pentadecyl | |
| Heptadecyl ketone | 16.8 |
| Stearone | 17.0 |
| Oleone | 17.3 |

It may be stated that the degree of chlorination may vary considerably from the amounts set forth in the table without greatly lessening the value of the anti-foam agent. It is desired to point out that during chlorination the ketone increases in weight. For example, in one sample of stearone chlorinated, as set forth in the above table, the density of the chlorinated material was 0.956 at 171° F. compared to water at 171° F. During the research carried out on this particular aspect of the invention, samples of stearone were chlorinated to a greater extent and found to have densities greater than water. For example, one sample gave a density of 1.049 at 171° F. compared to water at 171° F.

By introducing other groups into the herein set forth ketones, a method is provided of increasing the specific gravity of the anti-foam agent. However, it is desired to point out that for most purposes, the specific gravity of the agent should not be increased so that it is greater than water, although as pointed out, such a material may be used, provided it is mixed with a buoying agent and a bodying agent, as set forth.

The high molecular weight ketones, and particularly the aliphatic compounds may be substituted with aromatic groups. However, the loading of the aliphatic ketones with aromatic groups, as a usual thing, increases the density of the resulting compound so that it is greater than water, and as pointed out, it is desirable that the anti-foam agent have a specific gravity less than water. For example, acetophenone, phenyl methyl ketone, was produced by substituting in the alkyl ketone a phenyl group. However, the resulting anti-foam agent, namely, acetophenone, had a density considerably greater than water.

Another anti-foam agent which may be used in carrying out the present invention is the hydroxy substituted ketones, and particularly the hydroxy substituted compounds of the high molecular weight aliphatic ketones. The introduction of a hydroxy group into a ketone does not greatly increase the density of the unsubstituted ketone.

The hydroxy substituted ketones may be made from the chlorinated ketones above set forth, and this may be accomplished by hydrolyzing the chlorinated ketones to produce a hydroxy ketone. Particularly satisfactory results were obtained by using as the anti-foam agent in the compositions herein referred to the hydroxy substituted products of palmitone, pentadecyl heptadecyl ketone and stearone.

It is desired to point out that the mixed aliphatic and aromatic ketones, and particularly those having a density less than that of water are satisfactory in carrying out the present invention. One way of preparing mixed aliphatic and aromatic ketones is to load the aliphatic ketones, and particularly the high molecular weight ketones, with aromatic groups, preferably of high molecular weight, or vice versa, to load the aromatic ketones with aliphatic groups, preferably of high molecular weight.

The compounds herein set forth give markedly superior results when treating water containing excess alkalinity. If castor oil, which is a well known anti-foaming agent for water which does not contain excess alkalinity were used, the oil would become saponified and thereby rendered ineffective and/or harmful. In raw water and water softened in any well known manner, as for example by the lime-soda-ash process, the ketones as hereinbefore described are also effective.

In the claims, the term "ketone compound" is intended to include all ketones substantially insoluble in the aqueous bath being treated, hydroxy substituted ketones, halogenated ketones, and particularly the chlorinated ketones, and mixed aliphatic and aromatic ketones; all of said substitution products or derivatives of the ketones being substantially insoluble in the aqueous bath being treated.

It has been previously pointed out that admirable results have been obtained with a bodying material which will produce borate ions. The material producing the borate ions may be used alone as the bodying agent, or it may be mixed with additional bodying agents. It has been previously pointed out that dextrine may function as the bodying agent. However, the composition may be so proportioned that the bodying effect is obtained by the material which will produce the borate ions and when this is true, any of the prior art dispersing agents may be used, but preferably, those hereinbefore mentioned and more particularly a carbohydrate dispersing medium, such as corn meal, dextrine or starch degradation products. Where in the specification it is stated that corn meal or starch may be used as the bodying agent, it is of course, understood that the degradation products of corn meal or starch may be used as the bodying agent.

There is, therefore, provided, in accordance with the present invention, a composition for treating an aqueous bath and particularly waters of the character hereinbefore set forth, said composition containing an organic anti-foam agent substantially insoluble in the bath, a dispersing agent therefor and a bodying agent including a constituent provided with borate ions. Preferably, the dispersing agent includes tannin and dextrine, and a carbohydrate material, such as starch, dextrine or starch degradation products.

The stabilized anti-foam compositions of the character herein set forth are claimed in applicant's co-pending application Serial No. 193,367, filed March 1, 1938. The herein described anti-foam compositions having a bodying agent, including a constituent provided with borate or boron ions, are also claimed in said co-pending application.

The present application is a continuation-in-part of application Serial No. 57,638, filed January 4, 1936, said latter application being a continuation-in-part of application Serial No. 579, filed January 5, 1935.

The expression "comprising introducing into said bath a composition containing as its essential anti-foam agent an aliphatic ketone," or equivalent expressions, as used in some of the claims, is intended to cover the introduction of the ketone into the bath or of the bath into the ketone.

I claim:

1. The method of conditioning an aqueous bath having present ingredients inducing foaming therein, comprising introducing into said bath a composition containing as its essential anti-foam agent an aliphatic ketone containing at least eleven carbon atoms and characterized by the properties of being substantially insoluble in the aqueous bath being treated, steam distilling to a negligible extent, and showing little tendency to saponify with the ingredients of the bath, said ketone being present in an amount sufficient to inhibit foaming of the aqueous bath.

2. The method of conditioning boiler water containing excess alkalinity comprising introducing into said boiler water a composition containing as its essential anti-foam agent an aliphatic ketone containing at least eleven carbon atoms and characterized by the properties of being substantially insoluble in the boiler water being treated, steam distilling to a negligible extent, and showing little tendency to saponify with the ingredients of the boiler water, said ketone being present in an amount sufficient to inhibit foaming of the boiler water.

3. The method of conditioning an aqueous bath having an alkali constituent comprising introducing into said aqueous bath a composition containing as its essential anti-foam agent an aliphatic ketone containing at least eleven carbon atoms and characterized by the properties of being substantially insoluble in the aqueous bath being treated, steam distilling to a negligible extent, and showing little tendency to saponify with the ingredients of the bath, said ketone being present in an amount sufficient to inhibit foaming of the aqueous bath.

4. The method of conditioning boiler water comprising introducing into said boiler water a composition containing a dispersing agent, and as its essential anti-foam agent an aliphatic ketone containing at least eleven carbon atoms and characterized by the properties of being substantially insoluble in the boiler water being treated, steam distilling to a negligible extent, and showing litle tendency to saponify with the ingredients of the boiler water, said ketone being present in an amount sufficient to inhibit foaming of the boiler water.

5. The method of conditioning boiler water comprising introducing into said boiler water a composition containing a tannin as a dispersing agent, and as its essential anti-foam agent an aliphatic ketone containing at least eleven carbon atoms and characterized by the properties of being substantially insoluble in the boiler water being treated, steam distilling to a negligible extent, and showing little tendency to saponify with the ingredients of the boiler water, said ketone being present in an amount sufficient to inhibit foaming of the boiler water.

6. The method of conditioning boiler water comprising introducing into said boiler water a composition containing as its essential anti-foam agent an aliphatic ketone containing at least eleven carbon atoms, a dispersing agent for said ketone and a bodying agent which increases the viscosity of the composition and which prevents the separation of the anti-foam agent from the remainder of the composition, said ketone being present in an amount sufficient to inhibit foaming of the boiler water and characterized by the properties of being substantially insoluble in the boiler water being treated, steam distilling to a negligible extent, and showing little tendency to saponify with the ingredients of the boiler water.

7. The method of conditioning boiler water comprising introducing into said boiler water a composition containing as its essential anti-foam agent an aliphatic ketone containing at least eleven carbon atoms, a tannin as a dispersing agent for said ketone and a bodying agent which increases the viscosity of the composition and prevents the separation of the anti-foam agent from the remainder of the composition, said ketone being present in an amount sufficient to inhibit foaming of the boiler water and characterized by the properties of being substantially insoluble in the boiler water being treated, steam distilling to a negligible extent, and showing little tendency to saponify with the ingredients of the boiler water.

8. The method of conditioning boiler water comprising introducing into said boiler water a composition containing as its essential anti-foam agent an aliphatic ketone containing at least eleven carbon atoms, a tannin as a dispersing agent for said ketone and a carbohydrate bodying agent which increases the viscosity of the composition and which inhibits the separation of the anti-foam agent from the remainder of the composition, said ketone being present in an amount sufficient to inhibit foaming of the boiler water and characterized by the properties of being substantially insoluble in the boiler water being treated, steam distilling to a negligible extent, and showing little tendency to saponify with the ingredients of the boiler water.

9. The method of conditioning boiler water comprising introducing into said boiler water a composition containing as its essential anti-foam agent an aliphatic ketone containing at least eleven carbon atoms, a dispersing agent for said ketone and a carbohydrate bodying agent for increasing the viscosity of the composition, said ketone being present in an amount sufficient to inhibit foaming of the boiler water and characterized by the properties of being substantially insoluble in the boiler water being treated, steam distilling to a negligible extent, and showing little tendency to saponify with the ingredients of the boiler water.

10. The method of conditioning boiler water which has been softened by the lime-soda process comprising introducing into said water a composition containing as its essential anti-foam agent an aliphatic ketone containing at least eleven carbon atoms and characterized by the properties of being substantially insoluble in the boiler water being treated, steam distilling to a negligible extent, and showing little tendency to saponify with the ingredients of the boiler water, said ketone being present in an amount sufficient to inhibit foaming of the boiler water.

11. The method of conditioning boiler water which has been softened by treatment with a zeolite comprising introducing into said water a composition containing as its essential anti-foam agent an aliphatic ketone containing at least eleven carbon atoms and characterized by the properties of being substantially insoluble in the boiler water being treated, steam distilling to a negligible extent, and showing little tendency to saponify with the ingredients of the boiler water, said ketone being present in an amount sufficient to inhibit foaming of the boiler water.

12. A dispersible anti-foam composition for treating an aqueous bath to inhibit foaming therein, said composition containing as its essential anti-foam agent an aliphatic ketone containing at least eleven carbon atoms and characterized by the properties of being substantially insoluble in the aqueous bath being treated, steam distilling to a negligible extent, and showing little tendency to saponify with the ingredients of the bath.

13. A dispersible anti-foam composition for treating an aqueous bath to inhibit foaming therein, said composition containing as its essential anti-foam agent an aliphatic ketone containing at least eleven carbon atoms and characterized by the properties of being substantially insoluble in the aqueous bath being treated, steam distilling to a negligible extent, and showing little tendency to saponify with the ingredients of the bath; and a bodying agent which increases the viscosity of the composition and which inhibits the separation of the anti-foam agent from the composition.

14. An anti-foam composition for treating boiler water to inhibit foaming therein, said composition containing as its essential anti-foam agent an aliphatic ketone containing at least eleven carbon atoms, a tannin as a dispersing agent, and a bodying agent which increases the viscosity of the composition and which inhibits the separation of the anti-foam agent from the composition, said ketone being characterized by the properties of being substantially insoluble in the boiler water being treated, steam distilling to a negligible extent, and showing little tendency to saponify with the ingredients of the boiler water.

15. An anti-foam composition for treating boiler water to inhibit foaming therein, said composition containing as its essential anti-foam agent an aliphatic ketone containing at least eleven carbon atoms, a tannin as a dispersing agent, and a carbohydrate bodying agent to increase the viscosity of the composition, said ketone being characterized by the properties of being substantially insoluble in the boiler water being treated, steam distilling to a negligible extent, and showing little tendency to saponify with the ingredients of the boiler water.

16. Boiler water containing alkaline constituents and carrying a dispersed aliphatic ketone containing at least eleven carbon atoms acting as an anti-foam agent, said anti-foam agent being characterized by the properties of being substantially insoluble in the boiler water, steam distilling to a negligible extent, and showing little tendency to saponify with the ingredients of the boiler water.

17. An aqueous bath having ingredients present inducing foaming therein and containing an inhibitor for said foaming comprising a dispersed aliphatic ketone containing at least eleven carbon atoms and characterized by the properties of being substantially insoluble in the bath, steam distilling to a negligible extent and showing little tendency to saponify with the ingredients of the bath.

18. An anti-foam composition for treating an aqueous bath to inhibit foaming therein, said composition containing as its essential anti-foam agent a simple aliphatic ketone containing at least eleven carbon atoms and characterized by the properties of being substantially insoluble in the aqueous bath being treated, steam distilling to a negligible extent and showing little tendency to saponify with the ingredients of the bath.

19. An anti-foam composition for treating an aqueous bath to inhibit foaming therein, said composition containing as its essential anti-foam agent a mixed aliphatic ketone containing at least eleven carbon atoms and characterized by the properties of being substantially insoluble in the aqueous bath being treated, steam distilling to a negligible extent and showing little tendency to saponify with the ingredients of the bath.

20. An anti-foam composition for treating an aqueous bath to inhibit foaming therein, said composition containing as its essential anti-foam agent a mixture of simple and mixed aliphatic ketones, each of which contains at least eleven carbon atoms and characterized by the properties of being substantially insoluble in the aqueous bath being treated, steam distilling to a negligible extent and showing little tendency to saponify with the ingredients of the bath.

WAYNE L. DENMAN.